G. W. DALLIMORE.
CONVERTIBLE FREIGHT CAR.
APPLICATION FILED DEC. 28, 1918.
1,336,682.
Patented Apr. 13, 1920.
7 SHEETS—SHEET 3.
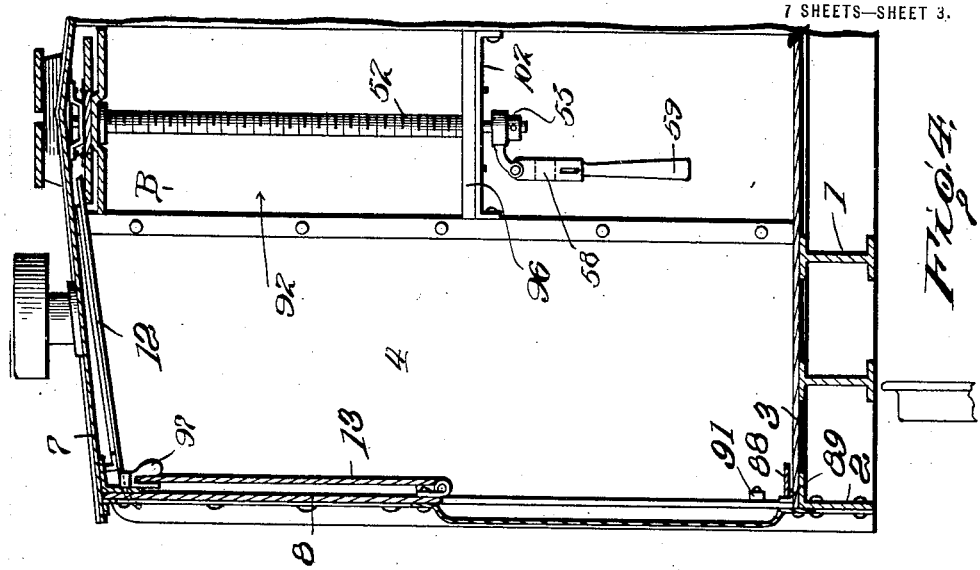
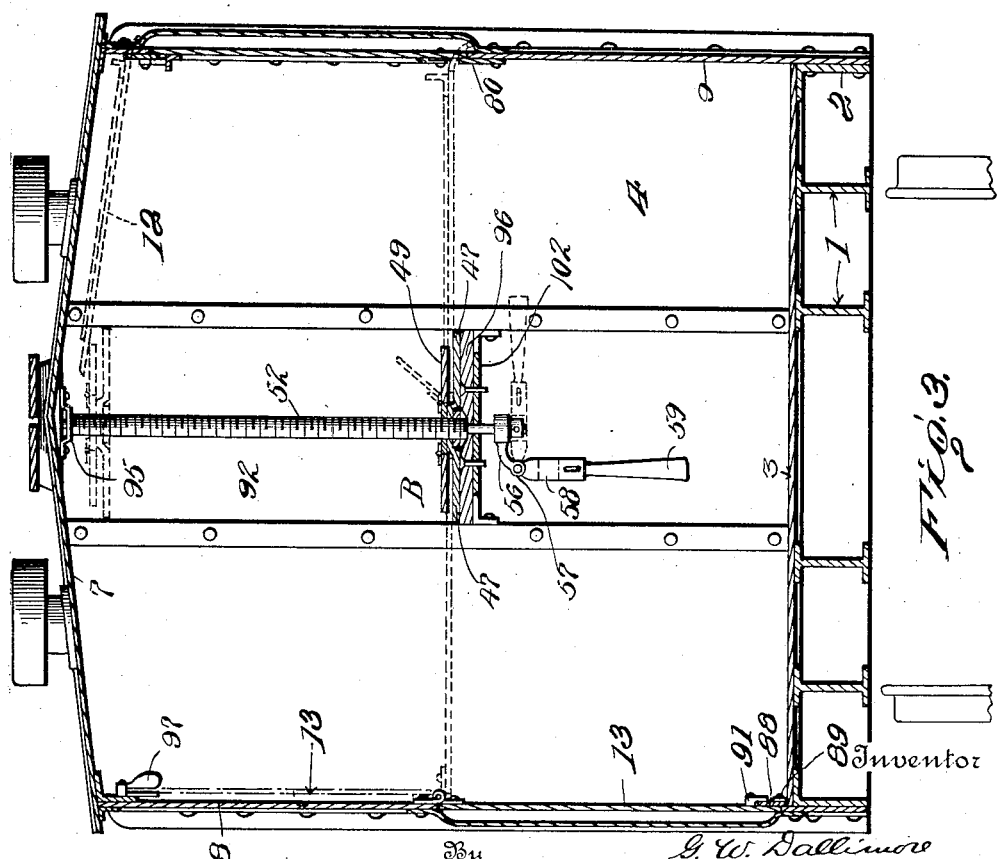

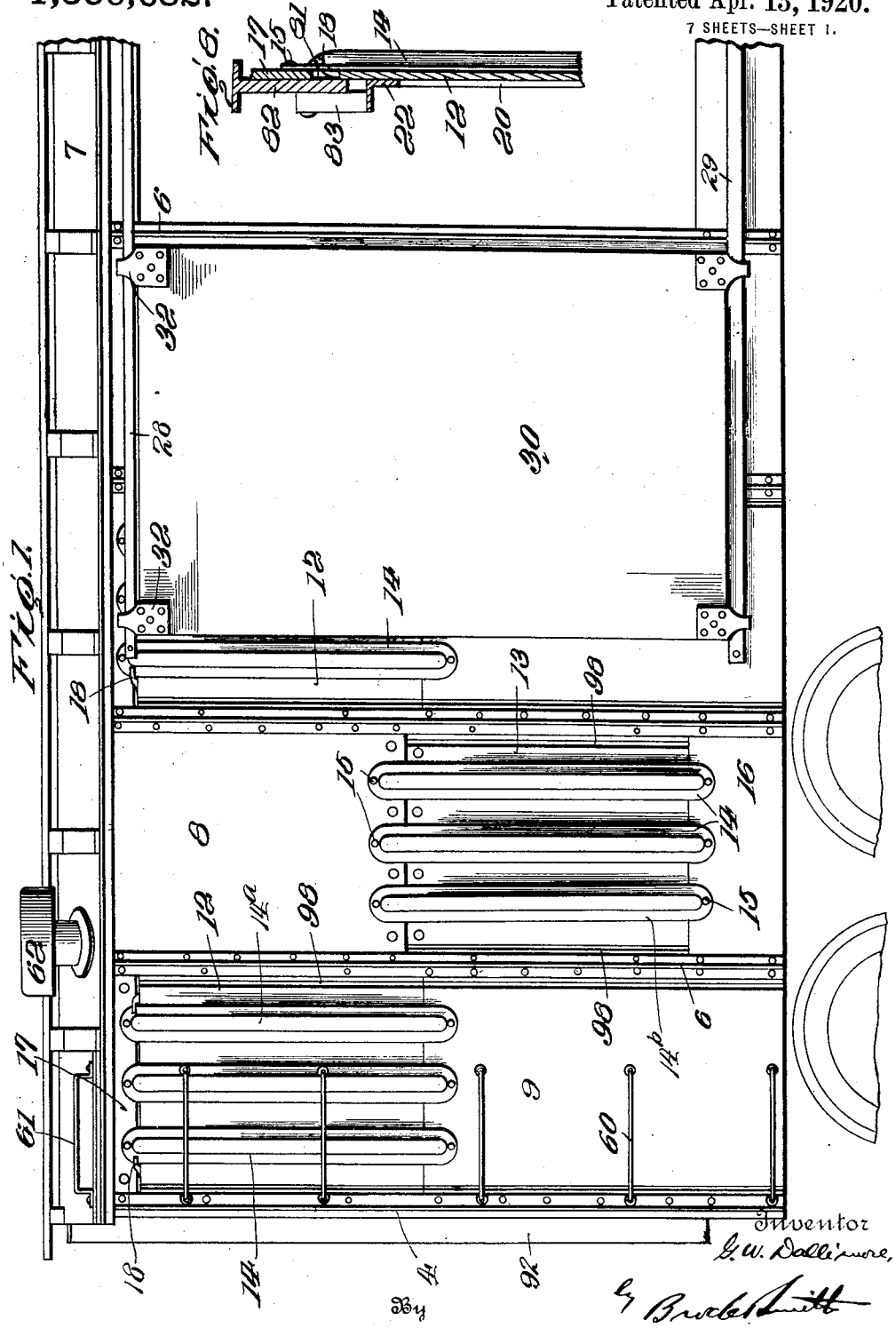

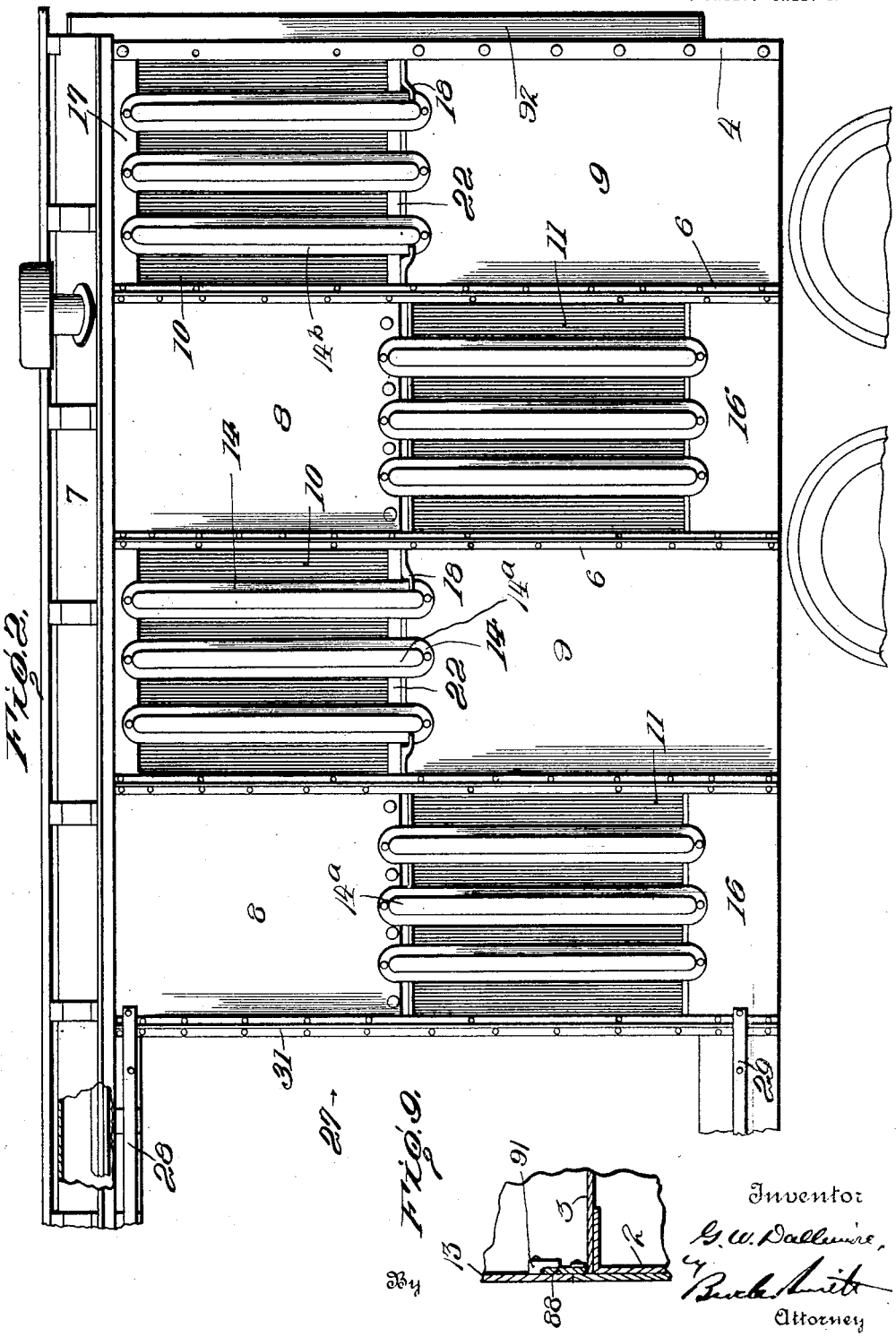

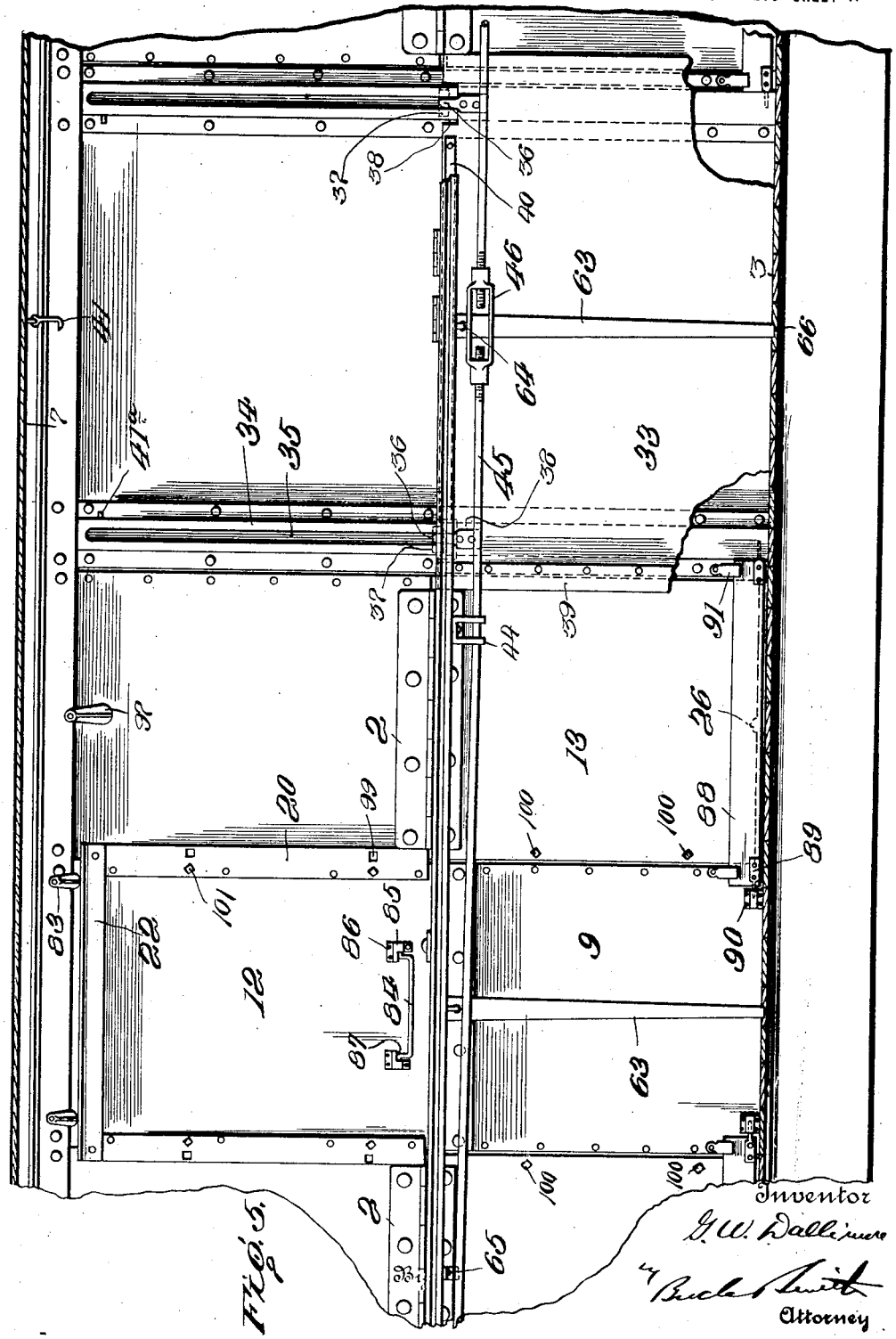

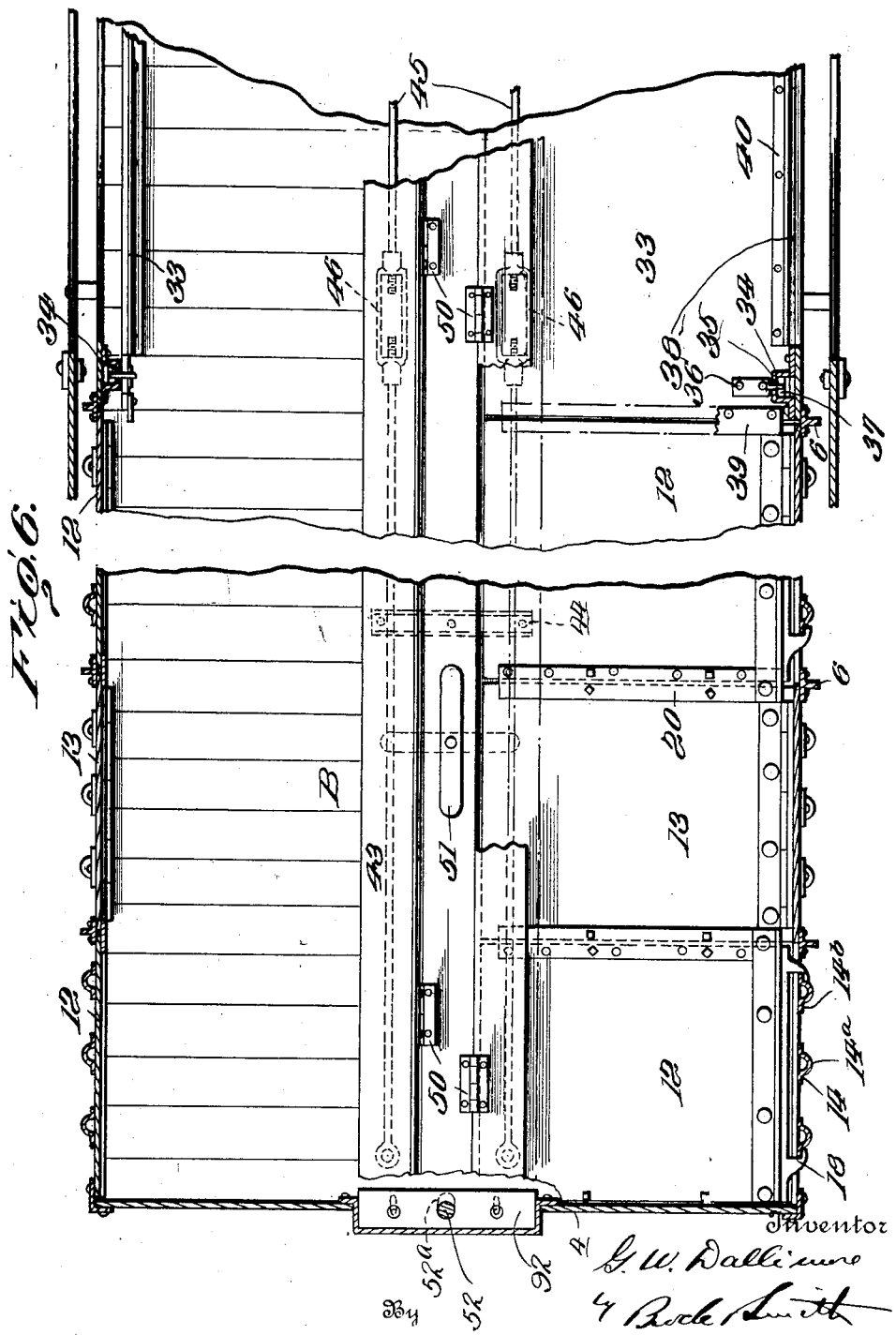

G. W. DALLIMORE.
CONVERTIBLE FREIGHT CAR.
APPLICATION FILED DEC. 28, 1918.
1,336,682.
Patented Apr. 13, 1920.
7 SHEETS—SHEET 6.
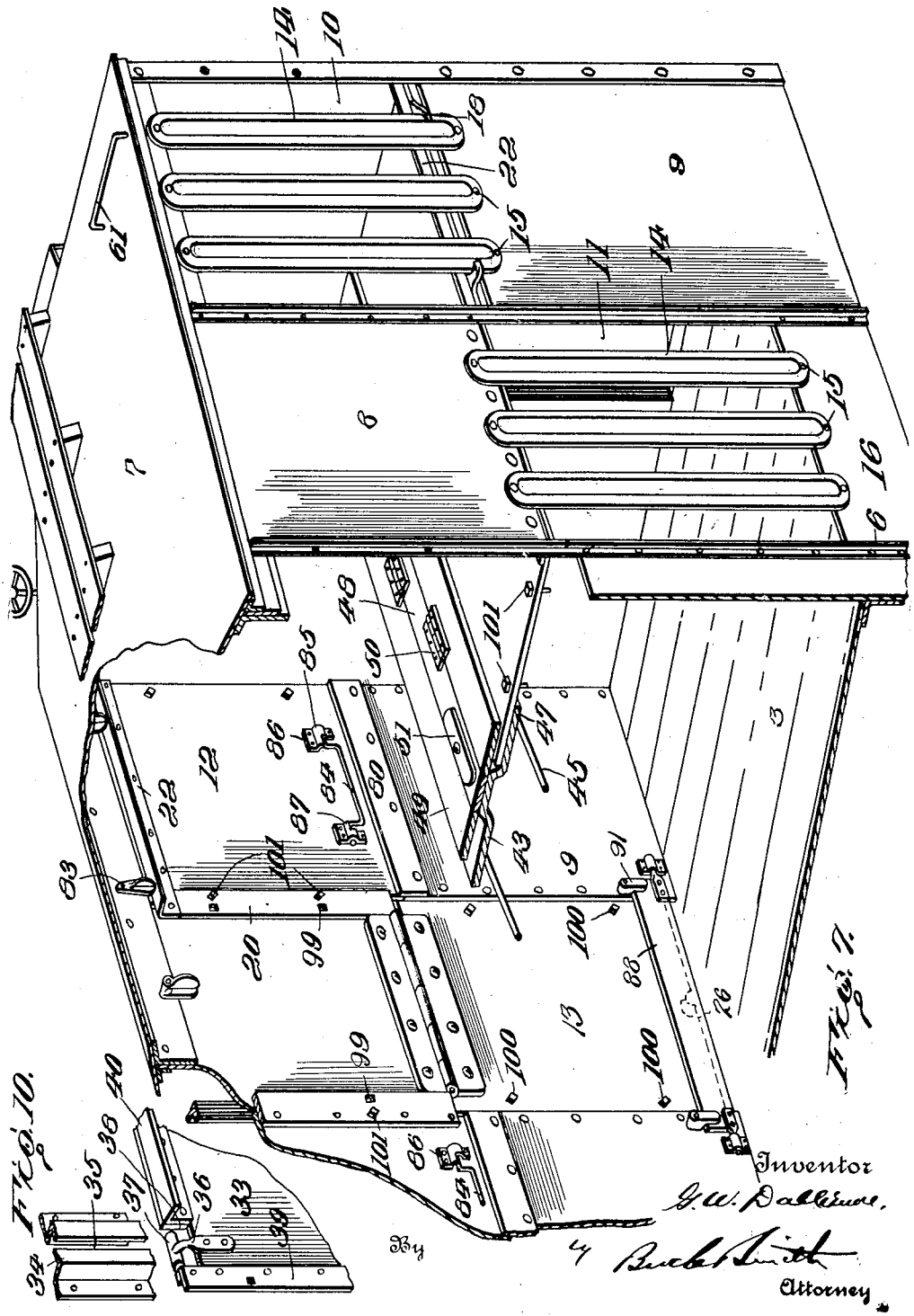

G. W. DALLIMORE.
CONVERTIBLE FREIGHT CAR.
APPLICATION FILED DEC. 28, 1918.
1,336,682.
Patented Apr. 13, 1920.
7 SHEETS—SHEET 7.
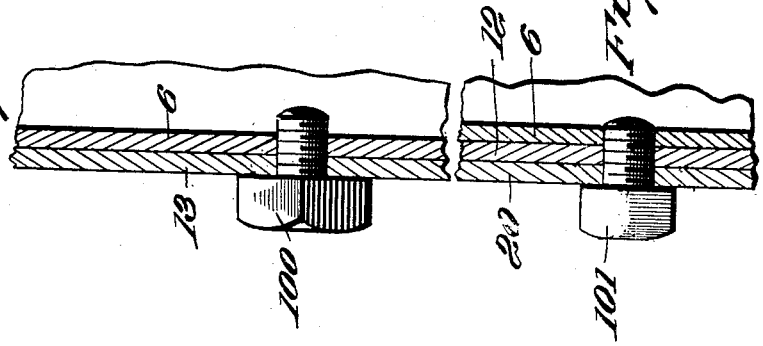
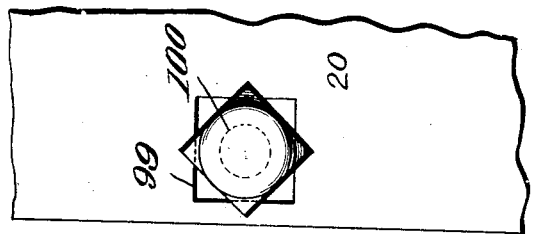
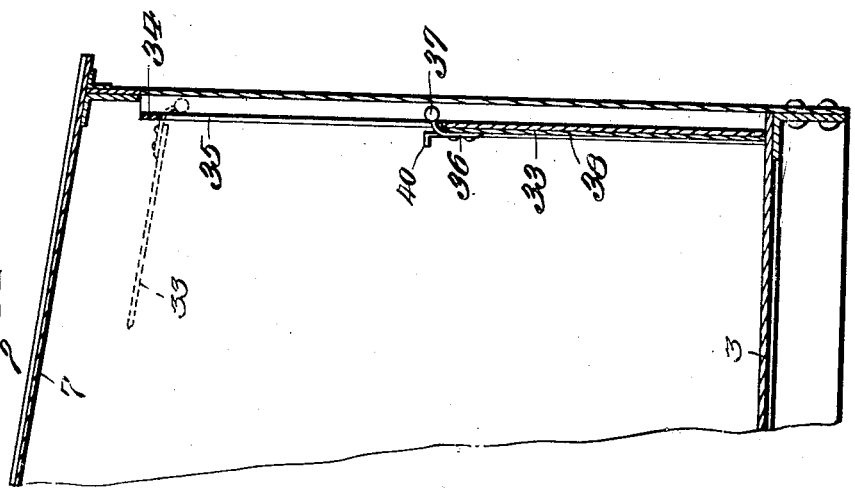

UNITED STATES PATENT OFFICE.

GEORGE W. DALLIMORE, OF OAKLAND, CALIFORNIA.

CONVERTIBLE FREIGHT-CAR.

1,336,682.   Specification of Letters Patent.   Patented Apr. 13, 1920.

Application filed December 28, 1918. Serial No. 268,698.

*To all whom it may concern:*

Be it known that I, GEORGE W. DALLIMORE, a citizen of the United States, residing at Oakland, in the county of Alameda and State of California, have invented new and useful Improvements in Convertible Freight-Cars, of which the following is a specification.

My invention provides for the construction and arrangement of a single car body so that it may be used as an ordinary box car, ventilated box car, a single-deck stock or a double-deck stock car. The invention also provides that all the parts required for all of the arrangements of the car are carried by the car body and are normally connected with other permanently located parts of the body; also that such disconnections as are necessary in changing from one arrangement to the other are made simply and easily with the hands or ordinary tools, such as wrenches.

The invention further provides that members constituting the upper deck when the car is arranged as a double-deck stock car form parts of the side walls of the car when it is arranged as a closed box car; or otherwise, that these members may be placed in special positions for ventilating the car when it is used as a ventilated box car or single-deck stock car and further, that this arrangement for ventilation may be with respect to the upper or lower part of the car or both.

The invention also provides that parts of the car may be arranged in the different ways specified without necessitating the arrangement of the entire car in that way. It also provides a central beam or support for the movable side members when they are used as an upper deck and for certain of the side members in certain of their other adjusted positions, together with novel means for raising and lowering the central beam. It also provides for making this beam an operatively integral structure which, when not used to support the upper deck, is normally carried at the top of the car where it is out of the way and requires no important adjustment or manipulation other than lowering it to adapt it to receive and support the upper deck. The invention also provides a construction having relatively few movable parts requiring relatively little manipulation in changing the car or portion of the car from one condition to another.

The invention also provides numerous novel and important details of construction which will be pointed out.

The accompanying drawing shows one exemplifying embodiment of the invention but it will be evident to persons skilled in the art, after studying this embodiment, that the invention may be embodied differently and I do not limit myself to details, except as claimed hereafter.

Figures 1 and 2 taken together constitute a side elevation of a car embodying the invention, the left hand end showing the car closed; the right hand end showing the car open for ventilation with respect to both the upper and lower parts of the car.

Fig. 3 is a transverse vertical section.

Fig. 4 is a similar section showing less than the full width of the car with parts in different positions from those of Fig. 3.

Fig. 5 is a vertical longitudinal section looking from the center of the car toward one of the sides, a part of which only is shown.

Fig. 6 is a condensed horizontal section showing one end and a part of the middle section of the car.

Fig. 7 is a sectional perspective of one end of the car.

Fig. 8 is a sectional detail showing the relation of the upper end of one of the movable upper side members to adjacent parts of the car.

Fig. 9 is a fragmentary section of parts adjacent to the floor of the car at one side showing mainly means for locking the lower movable side members in closed position.

Fig. 10 is a perspective detail of part of one of the door sections and its guide.

Figs. 11 and 12 are a front elevation and section respectively of a fastening device for the movable plates.

Fig. 13 is a detail section showing the fastening device for locking the plates in position.

Fig. 14 is a transverse sectional view at one side of a car showing the inner door section.

While some features of the invention might be embodied in a car of wooden or composite construction, the invention is particularly designed with reference to metal construction and will be so described, with the understanding that the description of certain parts as being of metal is not intended as being a limitation except where other material would not be suitable on account of its greater dimensions or for other reasons. For instance, floor beams in a metal car are usually of metal or might, in some cases, be of wood; so with other parts which will not be specifically referred to.

The bottom frame therefore consists conveniently of I-beams 1 and side angle beams 2 supporting the main floor 3, which will usually be of wood as shown, or which might be of other materials. This bottom frame supports the ends 4 which are preferably of metal and the details of which may vary considerably without reference to other features of the invention. The sides comprise permanently positioned members 6, which are usually strips of T-section connected at their bottoms to the bottom frame and extending to the roof 7 which they support. Between these vertical members are permanent side plates or members 8 and 9, arranged between alternate pairs of strips 6 along the upper and lower half of the car, respectively. The plates 8 and 9 are arranged alternately in respect to each other so that spaces 10 are left at intervals along the upper sides of the car and spaces 11 are left at intervals along the lower half of the sides and these spaces are arranged alternately in respect to each other, as best understood from Fig. 2.

The spaces 10 and 11 are closed at will by movable side members 12 and 13, which are usually steel plates of the same thickness as the permanent side plates 8 and 9.

The movable side members 12 and 13 in the present embodiment are made relatively wide so that a relatively small member is required for the car and the amount of manipulation required in changing the car from one condition to another is therefore relatively small. But evidently the width of these movable members and of other parts which are positioned in relation to them may be changed considerably to meet different requirements within the invention.

To provide convenient means of locating and manipulating certain of the movable side members and to reinforce the side construction, and also to provide center guards or bars for the spaces 10 and 11 to more effectively confine live stock, especially sheep and hogs, bars 14 are placed between strips 6 and suitably secured as by rivets 15 at top and bottom. A preferable cross-sectional shape of said bars, as shown by comparing Figs. 1, 2 and 6, consists in pressing them with a central concave reinforcing rib 14$^a$ leaving longitudinal side flanges 14$^b$, of which the outer ones on the two outside bars of each upper opening provide guides to coöperate with guide members carried by movable plates 12, referred to later.

Between the fixed side plates 9, short filler plates 16 are placed at the bottom, and between the fixed side plates 8, short filler plates 17 are placed at the top. The plates 17 provide abutments for the upper edges of the upper movable side members 12 and also provide, in connection with the plates 8, a continuous upper side wall extending slightly below the edge of the roof, and plates 16 provide abutments for the lower edges of the lower movable side members 13 and also provide, in connection with plates 9, a continuous lower side wall.

The upper movable side plates 12 fit within the rectangular spaces formed by the adjacent edges of plates 8, 9 and 17. At their upper outer edges the plates 12 have outwardly extending substantially hook-shaped members 18, each of which engages around the edge and outside of one of the side flanges 14$^b$ of one of the bars 14. When the plates 12 are in closed position the lower edges abut against the upper edges of the fixed plates 9. These abutting edges which may be beveled are overlapped by strips 80 which are riveted to the plates 9 near the upper edges. At this time the upper edges of plates 12 are in the plane of and slightly below the lower edges of the filler plates 17 as best seen in Fig. 8, a clearance space 81 being provided between the plates just mentioned. The upper edges of plates 12 are secured by frame members 82 to which are riveted the filler plates 17 and the lower edges of these frame members 82 somewhat overlap the upper edges of the plates 12. Somewhat below their upper edges the plates 12 are provided on their inner sides with transverse angle strips 22, which act as dirt guards, as later explained, and also coöperate to lock the plates 12 in closed position by engagement of their upper flanges with the swing latches 83 pivoted to frame members 82. With the parts in the position shown in Figs. 7 and 8, and at the left side of Fig. 5, the swing latches 83 and bolts 101 hold the plates 12 down with their lower edges behind the strips 80 and in close contact with T-sections 6 so that they cannot be accidentally displaced. When the latches 83 are swung away from vertical position, and bolts 101 backed out of T-sections 6 the plates 12 may be shoved up until their upper edges are about in contact with the filler plates 17 and then their lower edges are free from the strips 80 and may be swung inward and upward and the upper edges of the plates are free to slide downward with the hooked-shaped guides 18 sliding down over the edges of bars 14, and the side plates 12 may then be put in various positions, as later explained. To facilitate handling these plates, handles 84 may be provided which are in the form of elongated U-shaped rods with their ends bent outwardly and engaging hinge sockets 85 which are provided with flanges 86 riveted to the plates. The sockets have shoulders 87 which permit the handles to be swung out to a position at right angle with the plates, but no farther, and in that position they permit the plates to be easily lifted by means of the handles. When the handles are not in use they will fall flat against the plates and will be out of the way when the plates are in a closed position or when they are in position as part of the upper deck, as later explained.

The plates 12 are provided with edge strips 20 arranged to overlap the adjacent edges of plates 8 and these strips 20 terminate against the angle strips 22.

The lower movable sections 13 when closed fit within the rectangular spaces formed by the adjacent edges of plates 8, 9 and 16 and are hinged at their upper edges to the bottoms of plates 8, as best shown in Fig. 7. At their lower edges the plates 13 are provided with finger sockets 26 or other devices to facilitate the raising of the plates about the hinge axis as a center. These lower movable side plates may be placed in different positions and various intermediate or final positions incidental to different arrangements of the car as will be later described.

The plates 13 are secured in closed position by bolts 100 and by swinging or hinged strips 88 which are provided with hinge pintles 89 engaging hinge sockets 90 secured to plates 9 and the strips 88 are in turn secured by swing latches 91 pivoted to plates 9. With the parts in the position shown in Fig. 5, the plates 13 are locked in closed position and to release them the swing latches 91 are pushed aside, strips 88 are dropped to the floor of the car and bolts 100 backed out of T-sections 6, whereupon the lower edges of the plates 13 may be swung out and upward upon the hinges.

Usually, centrally at each side the car has a door opening 27 and upper and lower door rails 28 and 29 are arranged above and below the door opening and extend considerably to one side. A solid door 30 is mounted on the door rails by hangers 32 or other suitable means, and by reason of the length of the door rails the door may be placed at the door opening to close it, or may be moved away to opposite ends of the rails to uncover the opening.

Movable inner door sections 33 are also provided which may be used as grain, coal, or stock-doors, and these are adapted to coöperate with other parts for the various purposes of the invention, as will appear. For these inner door sections vertical guide members 34 are provided, consisting conveniently of channel bars riveted to the side plates close to the door opening. Guide slots 35 extend substantially from the top to the middle of the guide members, and in these slots are located the stems 36 of the T-headed members 37 secured to the inner door sections 33 in recesses 38, these recesses being adapted to accommodate the guide members 34. This arrangement of coöperating guides on the door section and door opening permits the upper edges of the door section to be moved vertically in the fixed guides to the limits of the slots 35, and at the same time permits the door to be swung around through a large part of a circle upon the heads 37 as a center in any of the positions of these heads in the guide slots. The door sections 33 are provided at the side edges with strips 39 corresponding substantially with the strips 20 of plates 12, and the door sections are further provided at the top edge with angle bars 40 corresponding substantially with similar bars 22 of plates 12. Hooks 41 carried by a suitable roof member may be provided to engage the lower edges of the inner doors when they are elevated near the roof to hold them in that position when desired, and pins 41$^a$ are provided in channel bars 34 to support the upper edges of the inner door sections when elevated.

To support the inner ends of the movable side members when the upper deck is in position, and to coöperate with the movable members in other ways mentioned later, a movable longitudinal center beam, designated generally as B, is provided. This, in the present embodiment, consists of a base plate 43 suitably braced by struts 44 and tension rods 45 with suitable tightening devices 46. A little distance from the center the base plate 43 is bent downward at each side and then extends outward again forming flat portions or ledges 47 upon which the inner ends of the movable side members are to rest. Upon the central part of base plate 43 is secured another long plate or strip 48, and to this, holding flaps or strips 49 are secured by hinges 50 arranged at suitable intervals. Pivoted locking bars 51 of the turn-button type, or other suitable devices, are provided for securing the holding strips 49 in active position. At each end of the car the beam B engages one of the elevating screws 52 by means of a threaded nut non-rotatably fixed to the beam or other suitable device. These screws are preferably located in vertical housings or recesses 92 formed in the ends of the car by putting in vertical angle pieces 93, of which the inner flanges are riveted to the end plates 4 and the outer flanges are riveted to a back plate 94. The upper end of each screw is journaled in a plate 95 near the upper end of the corresponding housing 92, the lower end of each screw is journaled in plates 96 and 102 located transversely in the housing about half way between the top and bottom. The housings not only accommodate the screws but furnish a vertical guide-way for the ends of the beam B. The lower end of each screw has an extension 54 to which a nut 55 is fixed. Revolubly located on the extension 54 above the nut is a short arm 56, bent downward, and provided with a clevis 57 in which is pivoted one side of a wrench head 58. This wrench head is provided with a nut socket to coöperate with nut 55, and any suitable reversible ratchet mechanism may be employed to operate it, and the head is also provided with a handle 59 of sufficient length to give the necessary leverage. To rotate the screw for elevating or lowering the beam the wrench handle 59 is swung up until the nut socket within head 58 engages nut 55, and in this movement the hub of arm 56 slides up somewhat on the screw extension 54. The ratchet being set in the desired direction, the handle is then oscillated and the screw is thus rotated in the required direction. Two men will usually be engaged in changing the car from one arrangement to another and in that case they will work the wrenches simultaneously and keep the beam fairly level in its movement, but otherwise one of the wrenches may be operated by one man sufficiently to move the adjacent end of the beam somewhat, and the man will then go to the other end of the car and operate that wrench to move that end of the beam a short distance, and so on. Provision is made in the base plate 96 supporting journal plate 102 and the elevating screws to allow considerable play of the screws and journal plate for the beforementioned purpose and other purposes, such as bulging of the ends of the car, etc. Fig. 6 shows slots 52$^a$ in the supporting members for the screws which will permit the necessary amount of movements of the ends of the screws journaled in plate 102 in the direction of the length of the car. Means could be provided to connect the screws to move together, but the complication and expense of such an arrangement will usually be unwarranted. Cars constructed in accordance with the invention are well adapted to carry the usual end ladders 60 and grab handles 61, and they may also be provided with roof ventilators 62 of suitable number, although such appurtenances do not coöperate with the features of the invention.

To further stiffen and support the beam B, it is usually provided with a suitable number of posts 63 (Fig. 5). These are pivotally secured to the lower side of the beam at 64 and when not in use may be swung up below the beam and secured by cleats 65 or other suitable devices. When the beam is in active position, as in Fig. 5, the posts 63 are released from the cleats and swung down, and their lower ends are inserted in sockets 66 in the floor.

Fig. 7, at the left; and Figs. 1, and 5, show the car in its closed box-car arrangement, except that certain of these figures show the beam B lowered. In full closed position the beam will, of course, usually be elevated and entirely out of the way. In this arrangement the upper movable side plates 12 are closed and secured by their holding devices, the lower movable side plates 13 are closed and secured by their holding devices, and the movable inner door sections 33 will usually be held up close to the roof by sliding their guide heads up in the guide slots 35 and engaging the upper (now outer) edges of the plates with pins 41$^a$ to support these edges of the doors at the upper ends of the slots and by engaging the lower (now inner) edges of the doors with hooks 41, or else the inner edges of the doors may be placed above the ledges 47 of the beam B before the beam is fully elevated, and the beam may then be fully elevated to hold the lower (now inner) edges of the door members in fully elevated position.

At any time when the beam is lowered a substantial distance from the top, the upper movable side plates 12 may be released from their fastening devices and opened to ventilate the upper part of the car. After the lower ends of plates 12 are moved inwardly, they may be swung around and their ends elevated sufficiently to go above the beam B, which then may be raised to support the lower (now inner) ends of plates 12 in substantially the position shown in full lines in Fig. 4. At any time while the beam B is considerably elevated, the lower movable side plates 13 may be opened to ventilate the lower part of the car and may be held open by the latches 97, as indicated in one of the dotted positions in Fig. 3, and in full lines in Fig. 4. In some cases, hooks may be provided on the roof members of the car to receive the free ends of plates 12. With the sides ventilated by the opening of plates 12 and 13, the car is in condition for use as a single-deck stock car, or ventilated car for any suitable purpose.

To arrange the car for use as a double-deck stock car, the movable side plates 13 should be swung up while the beam is sufficiently elevated to permit the free ends of the plates to pass it, and usually the plates will first be swung up and secured by their latches 97, as shown in Fig. 4. The beam is then lowered all the way, or to the position shown in Fig. 3. The holding flaps 49 are swung up and plates 13 are released from their latches and swung down so that their free ends rest on the beam ledges 47. The movable upper side plates 12, in whatever position they may happen to be, may be released from their locking devices, and the hooks 18 may be slid on the bars 14 to such position that when the free ends of the plates are swung around in a circular arc they will clear the beam. The plates are then lowered so that the hooks 18 and the adjacent ends of the plates 12 rest upon the ends of the upper edges of the fixed plates 9 and the free ends of the plates 12 rest on beam ledges 47. The edge strips 20 of the plates 12 then overlie the adjacent edges of plates 13 with heads of bolts 100 extending through slots 99 in strips 20. The bolts are then screwed down until corners of boltheads overlie adjacent edges of strips 20. This stiffens the whole floor structure, prevents yielding of the plates at their intersections, prevents upper movable plates from rising at their outer edges and prevents litter working through to the first deck. The inner door sections 33 may be manipulated in a similar manner to the movable plates 12 so that their upper edges are supported at the center of the door opening and in line with the outer edges of plates 12 and 13, the outer edge of the door sections being supported in that position by the guide heads 37 resting on the bottoms of the guide grooves. The edge strips 39 of the door plates 33 now overlie the adjacent edges of the plates 13 closest to the door openings with bolts 100 extending through slots 99 in strips 39, and the inner edges of the door plates lie upon beam ledges 47. The bolts are screwed down similarly to those in movable plates 12. The inner edges of all the movable plates are then locked by folding down the holding strips 49 and securing these strips by turn-buttons 51, or other suitable locking devices.

The car is then in the condition indicated in dotted lines in Fig. 3 and the right side of Fig. 7. But it is evident that the entire upper deck need not be laid as described at any one time because any part, such as one-fourth of the deck, may be laid in the described manner while the other movable parts are in other positions, and the inner door sections may or may not be arranged to form a part of the upper deck, as may be desired.

The advantage of different partial arrangements of the car, as described, and other arrangements that can be made will be evident to persons skilled in the art without further detailed explanation. It is important to notice that all the parts of the car have some definite attachment to other parts; that all of the connections, both fixed and movable, are substantial; that all of the adjustments may be made by simple mechanical means and by moderately skilled labor. The car can be changed entirely from one arrangement to another in a remarkably short time. None of the parts have to be folded or dismounted and put away in floor pockets or other special places in or away from the car, but instead of that all the movable parts, when changed from one arrangement, are definitely located in another useful arrangement of the car.

It will be noted that weather-proofness is very carefully provided for. Overlapping parts are provided at substantially every point of opening. For instance, vertical strips 6 overlie the side edges of plates 12 and 13 when closed; edge strips 20 of plates 12 overlap the adjacent edges of the permanent wall plates, etc. In some cases, to further provide for preventing water from getting into the crevices around the side wall openings, vertical grooves 98 may be provided on the outer faces of the movable and fixed plates just within the edges of strips 6. These grooves will catch water and will lead it downward without permitting it to gain entrance through the crevices around the movable plates. When the cars are to be loaded with very delicate or perishable goods, strips of weather proof paper may be laid between the edges of the movable plates and other members against which they abut before the movable plates are fastened in closed position.

When the upper deck is in position, as best understood from Figs. 3 and 7, the angle bars 22 of plates 12 and angle bars 40 of the inner door plates 33 form vertical ledges at the openings to prevent escape of bedding or other litter. The surfaces of plates 12 and 13 and inner door plates 33 which are upward when used as a deck may be roughened to provide a secure footing for animals, and the edge strips 20 and 39 further provide secure footholds. The outer (painted) surfaces of plates 12 and 13 being downward when used as a deck, are protected from being damaged or soiled.

The provision of a suitable number of convertible cars according to my invention will evidently largely decrease the total amount of rolling stock necessary and also the average waiting time for a car to be furnished on order, since any car of this class that is within call may be converted for any of its purposes within a short time without waiting for a specially constructed car which may be farther away.

It will be further noted that the car when in closed form offers the same protection from pilfering as the ordinary box car, as all movable parts are securely fastened on the inside of car, with no access to the fastening devices from the outside.

I claim—

1. In a car body, the combination of side walls having a series of separate vertical openings, a vertically movable center beam and wall members movably secured to the side walls and adapted to close the wall openings and form substantially parts of said walls when in one position and when in another position to coöperate with the beam to form an upper deck.

2. In a car body, the combination of side walls having a series of separate vertical openings, a vertically movable center beam and wall members movably secured to the side walls and adapted to close the wall openings and form substantially parts of said walls when in one position and when in another position to coöperate with the beam to form an upper deck, guideways recessed into the end walls to receive the ends of the beam and screws located within the guideways and engaging the beam to move it vertically.

3. In a car body, the combination of end walls, vertical guides thereon, a beam with its ends engaging the guides and capable of being raised to the car roof or lowered to a mid position, side walls having a series of upper openings and a series of lower openings in staggered relation to the upper openings and wall plates movably connected to the walls at one point and arranged to close the openings when in one position and when in another position to coöperate with the beam to form an upper deck.

4. In a car body, the combination of side walls having a series of upper openings and a series of lower openings in staggered relation to the upper openings, plates pivoted at the tops of the lower openings, guide members substantially coextensive with the upper openings and plates for the upper openings having a sliding and swinging engagement with the guide members.

5. In a car body, the combination of side walls having a series of upper openings and a series of lower openings in staggered relation to the upper openings, plates pivoted at the tops of the lower openings, guide members substantially coextensive with the upper openings, plates for the upper openings having a sliding and swinging engagement with the guide members, and means for securing the plates in closed position.

6. In a car body, the combination of side walls having a series of upper openings and a series of lower openings in staggered relation to the upper openings, plates pivoted at the tops of the lower openings, guide members substantially coextensive with the upper openings, plates for the upper openings having a sliding and swinging engagement with the guide members, a vertically movable center beam, and means for supporting it in substantially mid position of the car to receive the free ends of the side plates to form an upper deck.

7. In a car body, the combination of a vertically movable center beam, side walls having ventilating openings and a larger door opening, plates movably connected to the side walls and arranged in one position to close the ventilating openings and in another position to coöperate with the beam to form portions of an upper deck and a door plate movably connected to the side wall at the door opening and adapted in one position to close the lower part of the opening and in another position to coöperate with the beam and movable wall plates to complete the upper deck structure.

8. In a convertible car body, the combination of a side wall having a series of separate vertical openings, bars extending across the openings vertically at intervals and plates movably fitting the openings when closed and having members engaging the bars slidably and pivotally, so that the plates may be swung in relation to the bars as a center, and at the same time slid up or down upon the bars at the point of engagement.

9. The same as claim 8, with the addition of edge strips on the plates adapted to overlie adjacent surfaces on the wall when the plates are in closed position.

10. The same as claim 8, with the addition of flanges extending at right-angles from the upper ends of the plates, to form dirt guards when the plates are arranged horizontally to form part of a deck, and a movable center beam to support the inner ends of said plates when they are in horizontal position.

11. In a convertible car body, the combination of a vertically movable center beam, a side wall having a series of separate, vertical openings, extending from a point near the bottom of the body upward to approximately the middle, and movable lower side plates fitting the openings when closed and hinged at their upper ends to the side wall, the free ends of the plates coöperating with said center beam to form portions of an upper deck when the plates are in substantially horizontal position.

12. In a convertible car body, the combination with end and side walls and movable side plates adapted to close ventilating openings, of a center beam adapted to coöperate with said plates to form an upper deck, guideways in the end walls for the ends of the beam, screws rotatably mounted within said guideways and engaging the beam for elevating it, a wrench pivotally secured to the shaft of each of the screws, posts pivotally secured to the underside of the beam to support the beam when in active position, and cleats to hold the posts parallel to the beam when in inactive position.

13. In a convertible car body, the combination of side walls having upper openings and plates therefor, a series of lower openings, plates for the lower openings pivoted substantially at the upper ends of the openings and adapted to fit and close the openings when in one position, locking strips hinged near the intersection of the side wall and floor and arranged to overlap the lower ends of said lower movable plates when in closed position, and latches to secure the locking strips.

14. The same as claim 7, with the addition of guideways at the sides of the door opening and extending approximately from the vertical center of the opening to the top, and members carried by the door plate having a pivotal and sliding engagement with said guideways.

15. In a convertible car, the combination of side walls having openings extending downward from a point near the top, and movable plates to close said openings, the plates having means to movably connect them with the side walls, strips fixed on the side walls at the bottom of the openings and arranged to overlap the movable plates when the latter are in closed position, and movable latches near the tops of the openings to engage parts of the movable plates and hold them in closed position.

GEO. W. DALLIMORE.